(12) United States Patent
Mundt

(10) Patent No.: US 11,685,842 B2
(45) Date of Patent: Jun. 27, 2023

(54) ADHESIVE-COATED THERMALLY SENSITIVE POLYMER SUBSTRATE, PROCESS FOR ITS MANUFACTURE AND USE THEREOF

(71) Applicant: HENKEL AG & CO., KGaA, Duesseldorf (DE)

(72) Inventor: Stefan Mundt, Bad Saeckingen (DE)

(73) Assignee: HENKEL AG & CO., KGaA, Duesseldorf (DE)

( * ) Notice: Subject to any disclaimer, the term of this patent is extended or adjusted under 35 U.S.C. 154(b) by 215 days.

(21) Appl. No.: 15/256,953

(22) Filed: Sep. 6, 2016

(65) Prior Publication Data

US 2016/0369133 A1 Dec. 22, 2016

Related U.S. Application Data

(63) Continuation of application No. PCT/EP2014/054248, filed on Mar. 5, 2014.

(51) Int. Cl.
| | | |
|---|---|---|
| C09J 7/38 | (2018.01) | |
| C09J 7/24 | (2018.01) | |
| C09J 7/22 | (2018.01) | |
| C09J 7/21 | (2018.01) | |

(52) U.S. Cl.
CPC .............. *C09J 7/381* (2018.01); *C09J 7/21* (2018.01); *C09J 7/22* (2018.01); *C09J 7/245* (2018.01); *C09J 2301/302* (2020.08); *C09J 2301/312* (2020.08); *C09J 2301/416* (2020.08); *C09J 2401/006* (2013.01); *C09J 2409/00* (2013.01); *C09J 2423/006* (2013.01); *C09J 2423/046* (2013.01); *C09J 2423/106* (2013.01); *C09J 2427/006* (2013.01); *C09J 2433/00* (2013.01); *C09J 2467/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,786,552 A * | 11/1988 | Sasaki | ........................ | C09J 7/20 522/182 |
| 5,026,806 A * | 6/1991 | Rehmer | ................. | C08F 220/18 522/153 |
| 5,047,443 A * | 9/1991 | Rehmer | .................... | C08K 5/07 522/46 |
| 5,281,473 A * | 1/1994 | Ishiwata | ..................... | C09J 4/06 428/345 |
| 6,734,222 B2 * | 5/2004 | Fink | ........................ | C09J 133/08 428/355 R |
| 9,212,291 B2 * | 12/2015 | Beyers | ................... | B32B 27/306 |
| 2002/0006979 A1 * | 1/2002 | Husemann | ............. | C08F 220/18 522/34 |
| 2005/0176867 A1 * | 8/2005 | He | .......................... | C09J 153/02 524/487 |
| 2007/0196647 A1 * | 8/2007 | Yokoyama | ................ | B32B 7/12 428/355 AC |
| 2010/0143647 A1 * | 6/2010 | Tonniessen | ................ | B65C 9/20 428/137 |
| 2011/0014404 A1 * | 1/2011 | Beyers | .................. | B32B 27/302 428/522 |

FOREIGN PATENT DOCUMENTS

| | | | |
|---|---|---|---|
| DE | 10105278 A1 | 8/2002 | |
| DE | 102012200831 A1 | 7/2013 | |
| EP | 1184436 A1 | 3/2002 | |
| EP | 1528091 B1 | 7/2007 | |
| EP | 1693428 B1 | 9/2007 | |
| JP | 63251446 A | 10/1988 | |
| JP | 5-331426 A | 12/1993 | |
| JP | 09285759 A | 11/1997 | |
| JP | 2002317090 A | 10/2002 | |
| JP | 2005-125752 A | 5/2005 | |
| JP | 2006-265522 A | 10/2006 | |
| JP | 2009173769 A | 8/2009 | |
| JP | 2011-26615 A | 2/2011 | |
| JP | 2012-184369 A | 9/2012 | |
| JP | 2012-211305 A | 11/2012 | |
| KR | 100928004 B1 | 11/2009 | |
| WO | WO-9411175 A1 * | 5/1994 | ............ B29C 48/54 |
| WO | 2010106938 A1 | 9/2010 | |

OTHER PUBLICATIONS

Machine Translation of WO 2010/106938A1 (Year: 2010).*
Cameron, J. et al. "Improving the Performance of Hot Melt PSAs Using Extrusion or Crosslinking Technologies", Jun. 26, 2010, pp. 93-102, XP055138310, Retrieved on Sep. 4, 2014, from http://www.pstc.org/files/public/Cameron.pdf.
"Production Technology of Wood Products," Edited by Nanjing Forestry University, China Forestry Publishing House, Published Oct. 1983, paragraph 2 of p. 311.
"Environmental-Friendly Adhesive" Edited by Huang Shiqianq et al., Chemical Industry Press, published Oct. 2003, paragraph 3 on p. 390.

* cited by examiner

*Primary Examiner* — Scott R. Walshon
(74) *Attorney, Agent, or Firm* — Sun Hee Lehmann

(57) ABSTRACT

An adhesive-coated polymer substrate comprising (a) a polymer substrate containing or consisting of a thermoplastic polymer with a Vicat A50 softening point according to DIN EN ISO 306 of up to 220° C., and (b) an adhesive composition coated directly on at least one side of the polymer substrate, wherein the adhesive composition (b) is a UV-curable or UV-cured hot melt pressure sensitive adhesive (PSA) is disclosed. A process for the manufacture of the adhesive-coated polymer substrate as well as to the use thereof are also disclosed.

6 Claims, No Drawings

ADHESIVE-COATED THERMALLY SENSITIVE POLYMER SUBSTRATE, PROCESS FOR ITS MANUFACTURE AND USE THEREOF

FIELD OF THE INVENTION

The invention relates to an adhesive-coated thermally sensitive polymer substrate, a process for its manufacture and the use thereof. The invention relates in particular to an adhesive-coated thermally sensitive polymer substrate, wherein the thermally sensitive polymer substrate contains or consists of a thermaoplastic polymer with a VICAT A50 softening point according to DIN EN ISO 306, of up to 220° C., a preferred process for its manufacture and the use thereof.

BACKGROUND OF THE INVENTION

Thermally sensitive film, in general made of a thermoplastic polymer, could so far not be directly coated with a UV-curable hot melt pressure-sensitive adhesive (PSA) (in the following to be referred as "hot melt PSA") and cross-linked. Already in the course of coating the substrate with a non UV-curable hot melt PSA, the films are often thermally damaged at the usually applied temperatures of about 160-180° C. More importantly, at the latest in the curing of cross-linking step, when the UV-curable hot melt PSA is cross-linked upon irradiation with UV light of a common UV source, the films are thermally heavily damaged or even burnt. In particular films that have been pigmented with carbon black are burning off because of the infrared absorption of carbon black and the strong evolution of heat when cross-linking is performed with a customarily used medium pressure UV mercury lamp. As a result, it was therefore until now impossible to produce for example black PVC insulating tapes that are coated with a UV-cured hot melt PSA.

Various attempts have therefore been made to deal with these heat associated problems when thermally sensitive substrates such as those made of soft PVC are used.

EP 1 693 428 B1 relates to a backing film for adhesive tape of the hot-melt type based on bisoriented polypropylene (BOPP), comprising in succession at least one layer comprising polypropylene or a mixture of polypropylene resins, an opaque layer and a layer of a polyamide-resin based lacquer. This invention is concerned with the problem that the relatively high temperatures required by the holt-melt technique require the use of an adequately heat-resistant backing film, for example one based on bisoriented polypropylene, ruling out the use of the hitherto most commonly used material for this purpose, polyvinyl chloride (PVC).

EP 1 528 091 B1 describes a pressure-sensitive adhesive tape comprising a support and an adhesive layer or adhesive layers made of an adhesive agent comprising a base polymer and cross-linking agents on a single surface of the support or on the surface and the other surface thereof, wherein the support comprises soft polyvinylchloride comprising a plasticizer, and at least the adhesive agent on the single surface comprises, as a base polymer, an acrylic copolymer having a carboxyl group, and further comprises, as the cross-linking agents, a mixture of cross-linking agents comprising an isocyanate type cross-linking agent, a glycidylamine type cross-linking agent, and a malemine type cross-linking agent.

An object of the present invention is therefore the provision of an adhesive-coated thermally sensitive polymer substrate, wherein the adhesive is a UV-cured or UV-curable hot melt pressure sensitive adhesive (PSA) ("hot melt PSA"). Another object of the present invention is to provide a process for the manufacture of such an adhesive-coated temperature sensitive polymer substrate and a use for the adhesive-coated thermally sensitive polymer substrate.

DETAILED DESCRIPTION OF THE INVENTION

Accordingly, the present invention is directed to an adhesive-coated polymer substrate comprising:
(a) a polymer substrate containing or consisting of a thermoplastic polymer with a Vicat A50 softening point according to DIN EN ISO 306 of up to 220° C., and
(b) an adhesive composition directly coated on at least one side of the polymer substrate,
wherein the adhesive composition (b) is a UV-curable or UV-cured hot melt pressure sensitive adhesive.

In the adhesive-coated polymer substrate of the present invention, the polymer substrate contains or consists of the aforementioned thermoplastic polymer. Even if the polymer substrate consists of the aforementioned thermoplastic polymer, the presence of additives to obtain desired properties of the polymer substrate as for example a monomeric or polymeric plasticizer is not excluded.

The thermoplastic polymer with a Vicat A50 softening point according to DIN EN ISO 306 of up to 220° C., preferably of up to 200° C., even more preferably of up to 170° C. of the polymer substrate is preferably selected from the group of thermoplastic polymers consisting of polypropylene, in particular bisoriented polypropylene (BOPP), polyvinylchloride (PVC), in particular soft PVC (short term according to DIN 7728: PVC-P), polyethylene (PE), ethylene 1-alkene copolymers, regenerated cellulose (CELLOPHANE) and polylactid acid (PLA). Accordingly, the Vicat A50 softening point is used herein to indicate the temperature sensitive behavior of a substrate.

Among these, BOPP and soft PVC (short term according to DIN 7728: PVC-P) are more preferred.

The melting temperature of a UV-cured adhesive composition corresponding to a UV-curable adhesive composition that has been cured is usually much higher since the UV-curing and thus the crosslinking to higher molecular weight polymers is carried out after the coating of the UV-curable adhesive composition on the substrate.

In the adhesive-coated substrate of the present invention, the substrate shows only minor thermal damage. This means in particular, that the bulk composition of the substrate does essentially not differ from the composition at the surface.

The substrate may be a compact film or a fabric made of fibers from one or more thermoplastic polymers. The substrate may moreover be a laminate of a compact film with a fabric. In addition, the substrate may contain several films and/or fabrics.

The substrate may comprise various additives, including but not limited to plasticizers, dyes and/or pigments for example carbon black.

For the adhesive-coated substrate of the present invention, the most preferred thermoplastic polymer for the substrate is PVC, in particular soft PVC that has been plasticized with a monomeric and/or polymeric plasticizer. Suitable monomeric plasticizers are for example di-n-butyl-adipate, di-octyl-adipate (DOA), di-isononyl-phthalate (DINP), benzyl (2-ethyl-hexyl) adipate, mixtures of alkylsulphonic phenyl esters, and mixtures of glycerine acetates. Suitable polymeric plasticizers for PVC are in particular adipic acid polyesters. The latter are available under the tradenames ULTRAMOLL® (Lanxess) or PALAMOLL® (BASF).

Preferably, in the UV-curable hot melt pressure sensitive adhesive, the content of UV-curable copolymer, for example UV-curable polyacrylate or UV-curable synthetic rubber copolymer, is at least 30 weight-%, more preferably at least 70 weight-%, based on the total weight of the UV-curable hot melt PSA. The remainder in the UV-curable hot melt PSA would be additives incl. tackifiers in order to provide desired characteristics of the PSA.

The UV-curable hot melt pressure sensitive adhesive used for the adhesive-coated substrate of the present invention, especially such an adhesive containing a UV-curable acrylic copolymer, has preferably a viscosity, as measured at 140° C. with the rheometer MCR 300 of the company Anton Paar at $D=92.7s^{-1}$, in the range of from 10.000 to 50.000 mPa*s, preferably in the range of from 20.000 to 35.000 mPa*s.

In a preferred embodiment of the adhesive-coated polymer substrate, the hot melt PSA is a UV-cured PSA which is obtainable from the corresponding UV-curable hot melt PSA by irradiation with a UV light source such that the temperature at a distance of from 15 to 50 mm next to the surface of the coating of the UV-curable melt adhesive on the substrate does not exceed an upper temperature $T_{max}$ of 120° C. More preferably, the temperature $T_{max}$ does not exceed an upper limit temperature of 100° C. in the range of from 15 to 50 mm next to the surface of the coating of the UV-curable melt adhesive on the substrate.

Herein, the "corresponding UV-curable hot melt PSA" differs from the "UV-cured hot melt PSA" in general in that the latter is the result of the UV-curing of the former.

The chemical type of the UV-curable or UV-cured hot melt PSA of the adhesive composition (b) is not particularly limited. However, particularly suitable UV-curable or UV-cured hot melt PSAs are UV-curable polyacrylates, in particular acrylic copolymers, or synthetic rubber copolymers, optionally in combination with suitable resins as tackifiers and/or other additives commonly used in PSAs.

A preferred acrylic copolymer comprises a mixture of alkyl(meth)acrylates. Preferably, the mixture of alkyl(meth) acrylates comprises from 0.1 to 30 weight-%, based on the mixture, methyl(meth)acrylate.

In a preferred embodiment, the mixture of alkyl(meth) acrylates comprises 70 to 99.9 weight-%, based on the mixture, of C2 to C18 alkyl(meth)acrylates. Among these, C2-C10 alkyl(meth)acrylates, e.g., n-butyl acrylate, ethyl acrylate and/or 2-ethylhexyl acrylate are preferred.

The acrylic copolymer may further include other ethylenically unsaturated monomers. Suitable further ethylenically unsaturated monomers may be, for example, vinyl esters of carboxylic acids containing up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and 1 or 2 double bonds, or mixtures of these monomers.

Examples of vinyl esters of carboxylic acids having 1 to 20 carbon atoms are vinyl laurate, vinyl stearate, vinyl propionate, versatic acid vinyl esters, and vinyl acetate. Suitable vinylaromatic compounds are styrene, vinyltoluene, α- and p-methylstyrene, α-butylstyrene, 4-n-butylstyrene. Examples of nitriles are acrylonitrile and methacrylonitrile. The vinyl halides are chloro-, fluoro-, or bromosubstituded ethylenically unsaturated compounds, preferably vinyl chloride and vinylidene chloride. Examples of vinyl ethers are vinyl methyl ether and vinyl isobutyl ether. Suitable hydrocarbons have in particular 2 to 8 carbon atoms and two olefinic double bonds, and are for example butadiene, isoprene and chloroprene.

The acrylic copolymer may further contain ethylenically unsaturated monomers having carboxylic, sulfonic or phosphonic acid groups. Among these, monomers having carboxylic groups are preferred. Suitable examples include acrylic acid, methacrylic acid, itaconic acid, maleic acid, and fumaric acid. The copolymer may also contain other monomers, for example hydroxyl-containing monomers.

Preferred synthetic rubber copolymers are based on modified SBS (styrene-butadiene-styrene) or SIS (styrene-isoprene-styrene) block copolymers.

In order to allow cross-linking by UV light, the adhesive composition (b) contains in general a photoinitiator. It is noted that the terms "curable" and "cross-linkable" are used herein with the same meaning. The photoinitiator might be present in the adhesive composition as an added low molecular compound and/or a copolymerized photoinitiator.

Customary photoinitiators that can be used together with the acrylate copolymer or the synthetic rubber copolymer are, for example, acetophenone, benzoin ethers, benzyl dialkyl ketals, or derivatives thereof. The amount of photoinitiator mixed in is preferably from 0.05 to 10 parts by weight, especially from 0.1 to 2 parts by weight, per 100 parts by weight of the copolymer.

In the present invention, the use of a copolymerized photoinitiator is preferred. In the case of the copolymerized photoinitiator, for example the acrylate copolymer or the synthetic rubber copolymer, further contains, based on the weight of the copolymer, of from 0.05 to 10 weight-%, preferably from 0.1 to 2 weight-%, and even more preferably from 0.1 to 1 weight-% ethylenically unsaturated compounds having a photoinitiator group. The ethylenically unsaturated compound having a photoinitiator group is preferably an acetophenone derivative or, with particular preference, a benzophenone derivative. Suitable compounds are acetophenone or benzophenone derivatives containing at least one, preferably one, ethylenically unsaturated group. The ethylenically unsaturated group is preferably an acrylic or methacrylic group. The ethylenically unsaturated group can be attached directly to the phenyl ring of the acetophenone or benzophenone derivative. In general, a spacer group with up to 100 carbon atoms is situated between the phenyl ring and an ethylenically unsaturated group.

The photoinitiator effects upon the action of UV light a cross-linking of the copolymer, in general through a chemical grafting reaction of the photoinitiator group with a spatially adjacent polymer chain. Cross-linking can be effected in particular by inserting a carbonyl group of the photoinitiator into an adjacent C—H bond to form a —C—C—O—H grouping.

In a preferred embodiment, the adhesive-coated polymer substrate of the present invention is obtainable by irradiation and thus cross-linking the UV-curable hot melt pressure sensitive adhesive by a UV-C radiation source selected from the group consisting of a medium or low pressure mercury lamp, an excimer lamp and at least one LED. Preferably, the UV-C radiation source is a low pressure mercury lamp. More particularly, the low pressure mercury (amalgam) lamp emits essentially only light with a peak maximum at about 254 nm. Infrared radiation can be avoided which would lead to thermal damage of the thermally sensitive film. Herein, the term "mercury (amalgam) lamp" is sometimes used, since both terms "mercury" and "amalgam" are used with respect to such lamps.

In the adhesive-coated polymer substrate of the present invention, the thermoplastic polymer is preferably selected from the group consisting of polypropylene, in particular bisoriented polypropylene (BOPP), polyvinylchloride (PVC), in particular soft PVC, polyethylene (PE), ethylene 1-alkene copolymers, regenerated cellulose (cellophane®) and polylactid acid (PLA). More preferably, the thermoplastic polymer is soft PVC and the substrate contains a plasticizer. The plasticizer is preferably selected from among di-n-butyl-adipate, di-octyl-adipate (DOA), di-isononyl-phthalate (DINP), benzyl (2-ethyl-hexyl) adipate, mixtures of alkylsulphonic phenyl esters, mixtures of glycerine acetates, and adipic acid polyesters.

In a preferred embodiment, the soft PVC (short term according to DIN 7728: PVC-P) used as a preferred substrate in the present invention has a Vicat A50 value in the range of from 50 to 80° C. Moreover, the PVC-P preferably used shows in general in a tensile test, upon application of a tensile strength of 10 N/cm, a strain of 5 to 100%, preferably of 10 to 50%.

In a preferred embodiment of the present invention, in the adhesive-coated polymer substrate the UV-curable or UV-cured hot melt PSA contains an acrylic copolymer or a synthetic rubber copolymer. Herein, the acrylic copolymer comprises preferably a mixture of alkyl(meth)acrylates which comprises from 0.1 to 30 weight-%, based on the mixture, methyl(meth)acrylate.

In a preferred embodiment, the mixture of alkyl(meth)acrylates comprises 70 to 99.9 weight-%, based on the mixture, of $C_2$ to $C_{18}$ aklyl(meth)acrylates. Among these, $C_2$-$C_{10}$ alkyl(meth)acrylates, e.g., n-butyl acrylate, ethyl acrylate and/or 2-ethylhexyl acrylate are preferred.

The acrylic copolymer is obtainable by free-radical copolymerization from ethylenically unsaturated monomers. In the preferred case, where the photoinitiator is attached to the polymer, an ethylenically unsaturated compound having a photoinitiator group is preferably incorporated by copolymerization. The UV-cross-linkable copolymers can be prepared by copolymerizing the monomer components, using the customary polymerization initiators and, if desired, using regulators. The copolymerization can be carried out at the customary temperatures in bulk, in emulsion—for example in water or liquid hydrocarbons—or in solution. The copolymers are preferably prepared by polymerizing the monomers in solvents with a boiling range of from 50 to 150° C., using the customary amounts of polymerization initiators, their amounts being generally from 0.01 to 10 weight-%, in particular from 0.1 to 4 weight-%, based on the overall weight of the monomers. Suitable solvents include alcohols, such as methanol, ethanol, n- and isopropanol, n- and isobutanol, preferably isopropanol and/or isobutanol, hydrocarbons such as toluene and in particular petroleum spirits with a boiling range of from 60 to 120° C., ketones such as acetone and methyl ethyl ketone, preferably methyl ethyl ketone, and esters, such as ethyl acetate, and also mixtures of such solvents.

In the case of solution polymerization, appropriate polymerization initiators include, for example, azo compounds or ketone peroxides.

Subsequent to the polymerization in solution, the solvents are in general removed under reduced pressure and at elevated temperatures in the range of, for example, 100 to 150° C. Thus, the acrylic copolymers can be used in the solvent-free state, i.e., as melts. In many cases it is also of advantage to prepare the UV-cross-linkable acryl copolymers by polymerization in bulk, i.e., without the use of a solvent.

The adhesive composition containing the acrylic copolymer is preferably used in the form of a melt, i.e., in essentially solvent-free form for the manufacture of the adhesive-coated thermally sensitive polymer substrate. "Essentially solvent-free" means here that the solvent content is preferably less than 2 weight-%, more preferably less than 1 weight-%, based on the weight of the acrylic copolymer.

In order to obtain the coated substrate of the present invention, the adhesive composition containing the acrylic copolymer can be applied to the substrate from the melt by usual techniques, such as brushing, rolling, flow coating, die or knife coating. Hotmelt adhesives in general are melted with block melters or drum-unloaders. Coating is usually made at 150 to 180° C., depending on the specific application, on standard roller- or slot-die-coating machines.

In order to have a sufficient flowability of a PSA copolymer therein, the known PSA composition is in general coated on the substrate at a temperature of up to 180° C. This temperature could lead however to a damage of the film surface. In contrast, the UV-cross-linkable or UV-curable acrylic copolymer or synthetic rubber copolymer used in embodiments of the present invention allow that pre-polymers or low molecular weight polymers with high viscosity at room temperature are used for the coating of the substrate. The UV-cross-linkable or UV-curable acrylic copolymer can therefore be applied at a very low temperature, usually in the range of from 90-120° C., with excellent flowability.

The film thickness of the coated adhesive composition, i.e. the thickness of the adhesive layer on the partially or completely coated at least one side of the substrate, measured at 25° C., is preferably in the range of from 1 to 100 μm, more preferred in the range of from 1 to 30 μm and most preferred in the range of from 1 to 25 μm.

The thickness of the polymer substrate is in general in the range of from 30 to 1000 μm, preferably in the range of from 30 to 300 μm (0.03-0.3 mm). It has been surprisingly found that with the present invention the thickness of the substrate can be quite low, in particular from 30 to 103 μm (0.03-0.13 mm) in the case of soft PVC.

The invention is moreover directed to a process for the manufacture of an adhesive-coated polymer substrate comprising:
(a) a polymer substrate containing or consisting of a thermoplastic polymer with a Vicat A50 softening point according to DIN EN ISO 306 of up to 220° C., and
(b) an adhesive composition coated directly on at least one side of the polymer substrate,
wherein the adhesive composition (b) is a UV-curable or UV-cured hot melt pressure sensitive adhesive (PSA), comprising the steps:
(i) providing a polymer substrate containing or consisting of a thermoplastic polymer with a Vicat A50 softening point according to DIN EN ISO 306 of up to 220° C.;
(ii) coating directly a UV-curable hot melt pressure sensitive adhesive (PSA) on at least one side of the substrate;
(iii) and, if the adhesive composition (b) is a UV-cured hot melt pressure sensitive adhesive (PSA), curing adhesive composition (b) by irradiation with UV light.

In a more preferred process, the UV-curable hot melt pressure sensitive adhesive (PSA) is irradiated and cross-linked with a UV light source such that the temperature at a distance of from 15 to 50 mm next to the surface of the coating of the UV-curable hot melt pressure sensitive adhesive on the substrate does not exceed an upper temperature $T_{max}$ of 120° C.

In a preferred embodiment of the present invention, the polymer substrate is made from soft PVC and the UV-curable hot melt pressure sensitive adhesive (PSA) is an acrylic copolymer containing as monomer from 0.1 to 30 weight-% methyl(meth)acrylate.

In a preferred embodiment of the process, the UV-curable or UV-cured hot melt PSA contains an acrylate copolymer which is a mixture of alkyl(meth)acrylates that comprises 70 to 99.9 weight-%, based of the mixture, of $C_2$ to $C_{18}$ alkyl(meth)acrylates. Among these, $C_2$-$C_{10}$ alkyl(meth)acrylates, e.g. n-butyl acrylate, ethyl acrylate and/or 2-ethylhexyl acrylate are preferred.

In the process of the present invention, the coating of the substrate is preferably done by using a slot-die-coating machine. The coating speed may be for example as high as 60 m/min.

After the substrate has been coated with the adhesive composition (b) on at least a part of at least one of its two surfaces, the UV-cross-linkable copolymers in the UV-curable hot melt PSA are in general cross-linked by irradiation with UV light from a suitable UV source. The wavelength range of the UV light to be used is preferably in the range of from 200 to 450 nm, more preferably in the range of from 200 to 350 nm. The UV light used is most preferably in the UV-C region from 200 to 280 nm. It may however be advantageous to supplement such UV light with longer wave monochromatic light. As a UV-source, various lamps may be used. Suitable lamps are for example mercury (amalgam) lamps, excimer lamps or LEDs. Suitable mercury (amalgam) lamps are for example medium pressure and low pressure lamps. With regard to their use it is important to note that their surface temperatures are different. The surface temperature of a medium pressure mercury lamp is rather high, for example with the medium pressure mercury lamps obtainable from the Heraeus company the surface temperature is about 900° C. Under such circumstances, the distance between the lamp and the surface of the adhesive coating on the substrate must not only be large. In addition, an adequate cooling of the substrate must be assured. However, with low pressure lamps, the temperature on the surface of the low pressure mercury lamp is in the range of about 90 to 120° C. Moreover, the power consumption of medium pressure mercury lamps is about 180-240 W/cm and of low pressure mercury lamps about 4 W/cm.

Accordingly, in the process of the present invention, the use of low pressure mercury lamps is preferred. Thus, the adhesive-coated substrate of the present invention is preferably obtainable by a process wherein the cross-linking of the UV-curable hot melt pressure adhesive is effected by using a low pressure mercury lamp.

The UV lamps of the different types may be used alone or in combination. In one preferred embodiment, the UV-C light of a medium and/or a low pressure mercury lamp is combined with longer UV light from UV LEDs in order to obtain an improved curing result.

Moreover, the UV light might be delivered as a broad band spectrum, for example over the complete range of 200 to 300 nm (medium pressure mercury lamp) or at a particular wavelength, for example with a peak wavelength of about 254 nm (low pressure mercury lamp).

A further suitable UV source is an excimer lamp. Excimer lamps are mercury-free UV lamps, which deliver UV radiation with a monochromatic characteristics, produced by spontaneous emission of excimer (exciplex) molecules. The maximum of an excimer lamp radiation wavelength is specified by a working excimer molecule, for example KrCl* at 222 nm, KrF* at 248 nm, Xel* at 253 nm, $Cl_2$* at 259 nm or XeBr* at 282 nm. Moreover, no heat is generated since excimer UV lamps produce no infrared radiation.

It is moreover possible to use as a UV source in the UV-C region also LEDs.

In order to obtain the adhesive-coated substrates of the present invention, the use of low pressure mercury lamps is preferred. A very suitable UV light source is the low pressure mercury lamp with the name SOLUVA® UV-C cure module from Heraeus Noblelight GmbH. This module emits extremely intensive short-wave light with high efficiency. A specific reflector integrated in the module also contributes to the high efficiency of the module. The temperature at the surface of the UV light source is 90 to 120° C.

It has been found that this low pressure mercury lamp, UV-curable hot melt PSAs can be especially advantageously cross-linked on soft PVC (short term according to DIN 7728: PVC-P). This is especially true when the Vicat A50 value for PVC-P is in the range of from 50 to 80° C. The PVC-P used shows in general in a tensile test, upon application of a tensile strength of 10 N/cm, a strain of 5 to 100%, preferably of 10 to 50%.

The required UV dose from low pressure mercury (amalgam) lamps depends on the adhesive composition and needs to be established for each desired UV-curable or UV-cured hot melt PSA. Namely, the PSA properties depend on the applied UV dose (mJ/cm²). But it has been found that a suitable power consumption is in the range of 2.5 W to 16 W/cm at a working width of 1,300 mm when 4 lamps are used. These UV lamps are usually used as cassette modules with several UV lamps. The required curing is often achieved at a working distance of between 15 and 50 mm between the surface of the adhesive composition on the substrate and the surface of the UV lamp. Using these lamps it was found that there is only a low thermal stress on the substrate, namely a surface temperature which is often 35° C. in 30 mm distance from the lamps.

Depending on the UV-curable melt adhesive to be used for a specific substrate and the intended use and/or characteristics of such an adhesive-coated substrate, the characteristics of the UV light, in particular its dose and wavelength, may differ. Accordingly, different sources of UV-light may be used as long as the adhesive-coated substrate of the present invention can be obtained. For example mercury lamps (low-pressure and medium-pressure) and LED-lamps can be used. In the case of mercury lamps, low-pressure lamps are preferred in that they do not require carefully controlled cross-linking as with medium-pressure lamps in order to avoid serious damage or even a burning off of the temperature-sensitive substrates.

The characteristics of the coated and preferably cured adhesive composition will in particular also depend on the substrate. Namely, depending on the properties of the substrate it may be useful to provide the coated adhesive composition with specific characteristics. For example, if the substrate is a soft PVC substrate which contains plasticizers, it is desirable to prepare an adhesive coating that mitigates the migration of the plasticizer from the soft PVC substrate to the coated adhesive.

Suitable softening agents have been mentioned above with respect to soft PVC. It has been surprisingly found, that a particular advantageous adhesive UV-cured hot melt PSA coating for soft PVC containing 30 weight-% of adipic acid polyester as plasticizer can be obtained if at least one SOLUVA® UV-C lamp is used. The use of two or more lamps is preferred. Most preferably, 6 lamps are used. Moreover, the coating amount is preferably in the range of from 10 to 30 g/m², more preferably in the range of from 15 to 25 g/m² and most preferably in the range of from 18 to 22 g/m² UV-curable hot melt PSA based on acrylic copolymers.

In this regard it is preferred when a slot-die coating machine is used at a coating speed in the range of from 5 to 15 m/min.

For the cross-linking step, the substrate coated with the adhesive composition, i.e. a hot melt PSA is generally placed on a conveyor belt and the conveyor belt is guided past a suitable UV lamp. The degree of cross-linking of the copolymers depends on the intensity and duration of irradiation. The radiation UV-C dose is in general in the range of from 20 to 150 mJ/cm$^2$ of irradiated surface measured by a UV-C Power Puck II (EIT). It is preferable when the applied UV-C dose is in the range of from 30 to 50 mJ/cm$^2$.

The invention is moreover directed to the use of the adhesive-coated polymer substrate described herein for the manufacture of a pressure sensitive adhesive tape or a self-adhesive poster or banner.

The invention has numerous advantages. With the present invention, adhesive-coated substrates are provided wherein temperature sensitive substrates are coated with hot melt PSAs. Accordingly, the advantages of hot melt PSAs can be obtained also when thermally sensitive substrates are used. Namely, the applied adhesive composition does virtually not contain water or an organic solvent. Thus, no solvent recycling or burning off of residual solvent is required. This allows also a more compact manufacture of the adhesive-coated substrates, since long drying chambers are not required. Moreover, transport costs can be lower, since neither water nor organic solvents need to be transported.

It is moreover possible to obtain adhesive-coated substrates wherein an adhesive layer with a higher inner cohesion can be produced. It is in particular also possible to control a desired degree of inner cohesion in that the extent of UV cross-linking is controlled. By increased cross-linking, the polymer weight of the PSA increases. When the molecular weight of the PSA is high after cross-linking, the adhesive layer is in general more resistant to heat. Moreover, the cross-linking creates a high very level of permanent inner cohesion and therefore makes the adhesive layer resistant against plasticizers which might be present in the substrate and might migrate into the adhesive layer, leading to cohesion failure and damage to the adhesive. This is of particular importance in the case of soft PVC which usually contains significant amounts of a plasticizer. Via a proper individual selection of the UV dose that is to be used for the cross-linking, the adhesive properties of the adhesive-coated substrate can be set as desired.

In addition, the formation of a primer coating that is often required when an aqueous or organic solvent based adhesive composition is used can be avoided. Even without such a primer coating, a reduction of the plasticizer migration can be achieved with the present invention since rather high molecular weights of the polymer in the adhesive composition and thus a higher cohesion in the adhesive layer can be achieved when UV-curable hot melt PSAs are used.

EXAMPLE

A black soft PVC foil with a thickness of 0.12 mm containing 30 weight-%, based on the PVC film, of a polymeric plasticizer (hexanedioic acid, polymer of 1,3-butanediol and 1,4-butanediol with 2-ethylhexyl ester) was coated using a slot-die coating machine at a machine speed of 10 m/min with 20 g/m$^2$ of a UV-curable hot melt PSA containing 98 weight-% of a UV-curable polyacrylate containing 94 weight-% n-butyl acrylate, 5 weight-% acrylic acid and 1 weight-% VISIOMER® 6976 (solution of a methacryloyl benzophenone derivative in a methyl methacrylate/methacrylic acid mixture) from Evonics and 2 weight-% of a plasticizer (PALAMOLL® 654 of BASF SE; polyester of aliphatic dicarboxylic acids). The coated UV-curable hot melt PSA was then cured by using SOLUVA® UV-C modules (6 lamps) from Heraeus. The UV cross-linking dose was 40 mJ/cm$^2$, as measured with a UV-C Power Puck II (EIT).

The peel adhesion to steel was measured according to the FINAT method FTM 1 (peel adhesion (180°) at 300 mm/min speed) at room temperature. As a result, the adhesion to steel failure occurred at 12.7 N/inch (5 N/cm).

The soft PVC substrate coated with the UV-cured hot melt PSA was rolled up to a roll. The coil was then stored for 5 hours at a temperature of 70° C. in an oven to simulate ageing. Subsequently, a potential damage to the cohesion by a possible migration of the plasticizer present in the substrate into the adhesive composition, here into an adhesive layer, which is accelerated at elevated temperatures was assessed upon unrolling the coil. As a result, no cohesion failure of the adhesive layer took place upon unrolling the roll. Moreover, the adhesion to steel measurement at 180° according to the FINAT method FTM 1 at room temperature gave the result of 4.8 N/inch (1,89 N/cm), also with no cohesion failure.

Accordingly, such an adhesive-coated substrate could be used for example as a soft PVC adhesive tape for electric insulation.

The invention claimed is:

1. An adhesive-coated polymer substrate comprising:
   (a) a polymer substrate containing carbon black pigments and a thermoplastic polymer with a Vicat A50 softening point according to DIN EN ISO 306 of up to 220° C. and an additive selected from the group consisting of di-n-butyl-adipate, di-octyl-adipate, di-isononyl-phthalate, benzyl (2-ethyl-hexyl) adipate, mixtures of alkylsulphonic phenyl esters, mixtures of glycerine acetates, and adipic acid polyesters, and
   (b) a cured adhesive composition directly coated on at least one side of the polymer substrate, wherein the cured adhesive composition (b) is a UV-cured hot melt pressure sensitive adhesive (PSA) consisting of an acrylic copolymer having a viscosity of 20,000 to 35,000 mPas as measured in at 140° C. or a synthetic rubber copolymer and optionally, a tackifier or a plasticizer;
   wherein the acrylic copolymer is prepared from a mixture consisting of:
      (i) 0.1 to 30 weight-% of a methyl(meth)acrylate;
      (ii) 70 to 99.9 weight-% of n-butyl acrylate, ethyl acrylate, 2-ethylhexyl acrylate, acrylic acid or mixtures thereof; and
      (iii) 0.05 to 10 weight-% of a photoinitiator; and,
   wherein the adhesive-coated polymer substrate is obtained by cross-linking the coated UV-curable hot melt pressure sensitive adhesive by a UV-C radiation source representing a medium pressure mercury lamp that emits light with a peak maximum at about 254 nm.

2. The adhesive-coated polymer substrate according to claim 1, wherein the cured adhesive is a UV-cured hot melt pressure sensitive adhesive which is obtained by irradiating a corresponding UV-curable hot melt pressure sensitive adhesive by irradiation with a UV light source such that the temperature at a distance of from 15 to 50 mm next to the surface of the coating of the UV-curable melt adhesive on the substrate does not exceed an upper temperature Tmax of 120° C.

3. The adhesive-coated polymer substrate according to claim 2, wherein the temperature at a distance of from 15 to 50 mm next to the surface of the coating of the UV-curable melt adhesive on the substrate does not exceed an upper limit temperature Tmax of 100° C.

4. The adhesive-coated polymer substrate according to claim 1, wherein the thermoplastic polymer is selected from the group consisting of polypropylene, bisoriented polypropylene, polyvinylchloride, soft PVC, polyethylene, ethylene 1-alkene copolymers, regenerated cellulose and polylactic acid.

5. The adhesive-coated polymer substrate according to claim 4, wherein the thermoplastic polymer is the soft PVC.

6. The adhesive-coated polymer substrate of claim 1, which is a pressure sensitive adhesive tape or a self-adhesive poster or banner.

* * * * *

UNITED STATES PATENT AND TRADEMARK OFFICE
CERTIFICATE OF CORRECTION

PATENT NO. : 11,685,842 B2
APPLICATION NO. : 15/256953
DATED : June 27, 2023
INVENTOR(S) : Stefan Mundt It is certified that error appears in the above-identified patent and that said Letters Patent is hereby corrected as shown below:

In the Specification

Column 3, Line 45 change "C2 to C18" to --$C_2$ to $C_{18}$--.
Column 3, Line 46 change "C2-C10" to --$C_2$-$C_{10}$--.

In the Claims

Column 10, Line 44 change "mPas" to --mPa•s--.
Column 10, Line 66 change "Tmax" to --$T_{max}$--.
Column 11, Line 5 change "Tmax" to --$T_{max}$--.

Signed and Sealed this
Twenty-third Day of January, 2024

Katherine Kelly Vidal
*Director of the United States Patent and Trademark Office*